(12) United States Patent
Deisler

(10) Patent No.: US 9,707,858 B2
(45) Date of Patent: Jul. 18, 2017

(54) METHOD FOR CONTROLLING A STATE OF CHARGE OF A VEHICLE BATTERY

(71) Applicant: Bayerische Motoren Werke Aktiengesellschaft, Munich (DE)

(72) Inventor: Christopher Deisler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/869,128

(22) Filed: Sep. 29, 2015

(65) Prior Publication Data
US 2016/0016485 A1 Jan. 21, 2016

Related U.S. Application Data

(63) Continuation of application No. PCT/EP2014/056428, filed on Mar. 31, 2014.

(30) Foreign Application Priority Data

Apr. 3, 2013 (DE) .................. 10 2013 205 893

(51) Int. Cl.
*B60L 11/18* (2006.01)
*G01C 21/26* (2006.01)

(52) U.S. Cl.
CPC ....... *B60L 11/1872* (2013.01); *B60L 11/1861* (2013.01); *G01C 21/26* (2013.01)

(58) Field of Classification Search
CPC ... B60L 11/1872; B60L 11/1861; G01C 21/26
USPC ........................................ 701/22
See application file for complete search history.

(56) References Cited

U.S. PATENT DOCUMENTS

| 5,892,346 A | 4/1999 | Moroto et al. |
| 2009/0277702 A1 | 11/2009 | Kanada et al. |
| 2012/0200257 A1* | 8/2012 | Schwarz ............... H01M 10/42 320/109 |

FOREIGN PATENT DOCUMENTS

| CN | 101272942 A | 9/2008 |
| DE | 10 2012 001 820 A1 | 8/2012 |
| DE | 10 2012 003 046 A1 | 9/2012 |
| EP | 2 177 389 A1 | 4/2010 |
| JP | 2007-97359 A | 4/2007 |

(Continued)

OTHER PUBLICATIONS

International Search Report (PCT/ISA/210) issued in International Application No. PCT/EP2014/056428 dated Jun. 25, 2014, with English translation (Five (5) pages).

(Continued)

*Primary Examiner* — Brian P Sweeney
(74) *Attorney, Agent, or Firm* — Crowell & Moring LLP

(57) ABSTRACT

A method is provided for controlling a state of charge of a vehicle battery in order to ensure the starting capability of the vehicle. A battery temperature prediction for the vehicle battery is determined and the battery temperature prediction is used to determine a lower state-of-charge limit of the vehicle battery. The amount of charge in the vehicle battery is controlled in such a way that the state of charge of the battery at least does not fall below the lower state-of-charge limit. Data of a navigation system integrated in the vehicle or coupled to the vehicle are taken into account in the determination of the battery temperature prediction.

11 Claims, 1 Drawing Sheet

(56) References Cited

FOREIGN PATENT DOCUMENTS

WO     WO 2013/113751 A2     8/2013

OTHER PUBLICATIONS

German Search Report issued in German Application No. 10 2013 205 893.4, dated Nov. 14, 2013, with English translation (Ten (10) pages).
Chinese Office Action issued in counterpart Chinese Application No. 201480017343.7 dated Sep. 2, 2016, with English translation (twelve (12) pages).

* cited by examiner

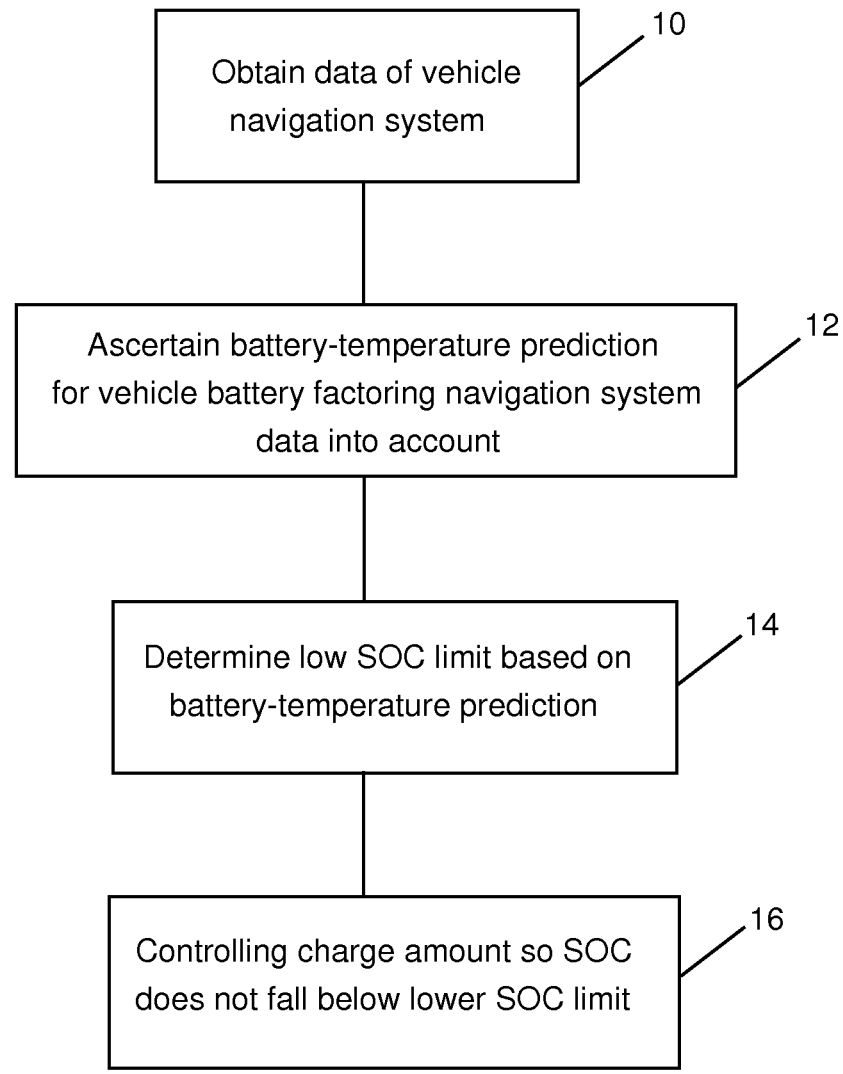

METHOD FOR CONTROLLING A STATE OF CHARGE OF A VEHICLE BATTERY

CROSS REFERENCE TO RELATED APPLICATIONS

This application is a continuation of PCT International Application No. PCT/EP2014/056428, filed Mar. 31, 2014, which claims priority under 35 U.S.C. §119 from German Patent Application No. 10 2013 205 893.4, filed Apr. 3, 2013, the entire disclosures of which are herein expressly incorporated by reference.

BACKGROUND AND SUMMARY OF THE INVENTION

The invention relates to a method for controlling a state of charge of a vehicle battery for the purpose of ensuring the startability of the vehicle.

The startability of vehicles depends fundamentally on various status factors of the starter battery. One significant status factor is the temperature of the battery when the vehicle is started. The lower the battery temperature, the higher the state of charge of the battery has to be in order to be able to guarantee starting of the vehicle. In order to be able to ensure startability, attempts are currently being made to estimate, via a risk assessment, the lowest battery temperature that might obtain when the vehicle is started. For the purpose of estimating the lowest temperature, the lowest temperature during the parking time of the vehicle and the lowest temperature during travel are ascertained and are drawn upon as a so-called "worst case" for the risk assessment. Depending on this estimated lowest battery temperature, a lower state-of-charge limit of the vehicle battery is determined, and the amount of charge in the vehicle battery is controlled in such a way that the state of charge of the battery at least does not fall below the lower state-of-charge limit. A future evolution of the temperature is not taken into account in this case.

A method for controlling a state of charge of a vehicle battery is already known from DE 10 2012 001 820 A1, wherein a battery-temperature prediction for the vehicle battery is generated. This battery-temperature prediction is used in order to determine a desired (temperature-dependent) SOC range for the vehicle battery. For the purpose of generating the battery-temperature prediction, inter alia a forecast outside temperature at the current position of the vehicle is received by a telematics terminal which receives this forecast temperature from a weather service.

A disadvantage in this case is that even when, on the basis of the telematics data, very low temperatures are forecast which would require an adaptation of the SOC range, the state of charge of the battery at the relevant parking location can no longer be increased to a sufficient extent, since the vehicle will shortly be parked or has already been parked.

Now, the object of the invention is to provide a method for controlling a state of charge of a vehicle battery, said method being improved as regards the aforementioned problems.

This and other objects are achieved by a method for controlling a state of charge of a vehicle battery for the purpose of ensuring the startability of the vehicle, wherein a battery-temperature prediction for the vehicle battery is ascertained and the battery-temperature prediction is used in order to determine a lower state-of-charge limit of the vehicle battery. The amount of charge in the vehicle battery is controlled such that the state of charge of the battery at least does not fall below the lower state-of-charge limit. Data of a navigation system integrated within the vehicle or coupled with the vehicle are taken into account in the ascertainment of the battery-temperature prediction.

The method according to the invention and also advantageous configurations thereof can be carried out by means of an implemented algorithm or by means of an appropriate arrangement of assemblies in a control unit provided for this purpose.

The method according to the invention for controlling a state of charge of a vehicle battery for the purpose of ensuring the startability of the vehicle is basically configured in such a manner that a battery-temperature prediction for the vehicle battery is ascertained and this battery-temperature prediction is used in order to determine a lower state-of-charge limit of the vehicle battery. The amount of charge in the vehicle battery is consequently controlled in such a way that the state of charge of the battery at least does not fall below the lower state-of-charge limit.

Now the insight underlying the invention is that although in the case of the method known from DE 10 2012 001 820 A1, a future (regarded temporally) battery-temperature prediction on the basis of known meteorological data is undertaken at the current position of the vehicle, under certain circumstances falling temperatures can then be reacted to only very late—in some cases too late. This may have the consequence that the startability can no longer be ensured, since an appropriate charging of the battery is no longer possible because the vehicle is no longer in operation (has not been in operation long enough).

In order to obviate this problem, the method according to the invention provides that data of a navigation system integrated within the vehicle or coupled with the vehicle are taken into account in the ascertainment of the battery-temperature prediction. Said data are advantageously data that include or make possible a statement about the future position of the vehicle. These data can make a relevant contribution to the outcome that a battery-temperature prediction is already undertaken in good time in regions in which ensuring the startability of the battery is relevant.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a highly simplified flow diagram illustrating an exemplary method according to the invention.

DETAILED DESCRIPTION OF THE DRAWINGS

Referring to FIG. 1, the method operates by obtaining data of a navigation system integrated within the vehicle or coupled with the vehicle (10). The method ascertains a battery-temperature prediction for the vehicle battery taking into account the data of the navigation system (12). The method determines a lower state-of-charge limit of the vehicle battery using the battery-temperature prediction (14). The method controls an amount of charge in the vehicle battery such that the state of charge of the battery does not full below the lower state-of-charge limit (16). Accordingly, the method controls the state-of-charge of the vehicle battery for the purpose of inferring startability of the vehicle.

Advantageously, in particular data of the navigation system that include an indication of a presumed parking position of the vehicle are taken into account in the ascertainment of the battery-temperature prediction, since the startability has to be ensured precisely for this position of the vehicle. To this end, in an advantageous development, in particular destination position data of a planned or presumed—by reason of the user behavior of the driver—route of the navigation system can be taken into account in the ascertainment of the battery-temperature prediction.

Alternatively or additionally, the position data of a planned or presumed—by reason of the user behavior of the driver—route can also already be taken into account in the ascertainment of the battery-temperature prediction. The identification or presumption of the route to be traveled—by reason of the user behavior of the driver—or of the travel destination may, for example, be undertaken by a prognosis of the travel destination by reason of the user behavior. For example, within the vehicle it may be known that the driver always heads for a defined destination (for example, place of work or place of residence) within a defined time window.

The relevant data of the navigation system may be various route-dependent or destination-dependent data—that is to say, in a particularly advantageous development of the invention the data of the navigation system are taken into account in the ascertainment of the battery-temperature prediction in such a manner that current or forecast outside-temperature data at the presumed parking position and/or along the planned or presumed—by reason of the user behavior of the driver—route and/or within the range of the destination position data of the planned or presumed—by reason of the user behavior of the driver—route of the navigation system are taken into account.

For example, if on the basis of the destination data it is known that the vehicle is traveling to a mountainous region, it can be assumed that the outside temperature will fall continuously over the entire route and will be significantly lower at the destination than at the point of departure. This information can make a significant contribution at the time of the prediction of the battery temperature, since by reason of this prediction the lower state-of-charge limit of the vehicle battery can already be raised in good time—that is to say, before the destination or the presumed parking position of the vehicle is reached—and, accordingly, the amount of charge in the vehicle battery can consequently be controlled in such a way that the state of charge of the battery at least does not fall below the lower state-of-charge limit.

Alternatively or additionally, the outside temperatures that are forecast (along the route or at the parking location of the vehicle) may, for example, be received by a telematics terminal which receives the information about the future outside temperature at the corresponding future position of the vehicle from a provider external to the vehicle, in particular from a weather service.

The significant advantage of the invention can now be seen in the fact that at the time of the prediction of the battery temperature not only future—regarded temporally—outside-temperature data but also future—with regard to the position of the vehicle—outside-temperature data are taken into account. As a result, even in the case of large differences in outside temperature an adaptation of the lower state-of-charge limit in good time and—associated therewith—a timely adaptation of the state of charge of the starter battery can be made possible, so that a reliable start can be guaranteed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a state of charge of a battery of a vehicle in order to ensure startability of the vehicle, the method comprising the acts of:
    ascertaining, via a programmed control unit, a predicted battery-temperature at a future location of the vehicle at a future time, based on vehicle navigation system data;
    determining, via the programmed control unit, a lower limit for the state of charge, the lower limit being the state of charge necessary to start the vehicle at the future time based on the predicted battery-temperature at the future location at the future time; and
    controlling, via the programmed control unit, the state of charge, prior to the vehicle arriving at the future location, such that the state of charge at least does not fall below the lower limit.

2. The method according to claim 1, wherein the navigation system data includes a presumed parking position of the vehicle at the future time.

3. The method according to claim 2, wherein ascertaining the predicted battery-temperature is based on outside-temperature data at the presumed parking position.

4. The method according to claim 3, wherein the outside-temperature data includes outside-temperature forecast data received by a vehicle telematics system from an external provider.

5. The method according to claim 4, wherein the external provider is a weather service.

6. The method according to claim 1, wherein the navigation system data includes anticipated route information.

7. The method according to claim 6, wherein the anticipated route information includes destination position data.

8. The method according to claim 7, wherein the destination position data is based on behavior of a driver of the vehicle.

9. The method according to claim 7, wherein ascertaining the predicted battery-temperature is based on outside-temperature data within a range of the destination position data of the anticipated route.

10. The method according to claim 6, wherein the anticipated route information is based on behavior of a driver of the vehicle.

11. The method according to claim 6, wherein ascertaining the predicted battery-temperature is based on outside-temperature data along the anticipated route.

* * * * *